INVENTOR
Bernard Edward Shlesinger, Jr.

INVENTOR
Bernard Edward Shlesinger, Jr.
BY Bernard Edward Shlesinger Jr.

United States Patent Office 3,439,179

Patented Apr. 15, 1969

3,439,179

LIGHT-RESPONSIVE CROSSBAR SWITCH HAVING VARIABLE INTENSITY CONTROL

Bernard Edward Shlesinger, Jr., 3906 Bruce Lane, Annandale, Va. 22003

Continuation-in-part of application Ser. No. 413,903, Nov. 25, 1964, now Patent No. 3,360,657, dated Dec. 26, 1967. This application Oct. 27, 1967, Ser. No. 678,585

Int. Cl. H01j *39/12*

U.S. Cl. 250—227 17 Claims

ABSTRACT OF THE DISCLOSURE

A cross bar switch comprising a panel board; a first series of light or wave transmitting or signal carrying members positioned in the panel board in parallel spaced relation to each other; a second series of light or wave transmitting or signal carrying members positioned in the panel board in parallel spaced relation to each other and in crossed relation to the first series of members to form a grid arrangement having spaced intersections; a separate light, wave, or signal transmitting source for each of said transmitting or signal carrying members; means for selectively operating each of said sources; the spaced sections in the zone thereof each having located therein a light or wave or signal sensitive element sensitive to the combined light or wave or signal only; whereby the electrical components will be operated depending upon their electrical operating level.

*Historical background*

This invention relates to crossbar switching mechanisms and particularly to those which are responsive to light or similar wave-type energy and is a continuation-in-part of my application Ser. No. 413,903, filed Nov. 25, 1964.

In the past, crossbar switching has been done primarily by mechanical means which is relatively slow and requires rather complex equipment. More recently, electronic crossbar switching has been devised, but it involves complex wiring and electrical components. My aforementioned application, though an improvement over the prior art; nevertheless, was limited to a relatively small number of operable circuits.

*Objects and Summary*

It is therefore an object of this invention to provide a crossbar switch mechanism which has greater flexibility permitting a much larger number of operable circuits for the same panel area.

Still another object of this invention is to provide a crossbar switching mechanism which has a memory storage system.

Another object of this invention is to provide a crossbar switch mechanism which is fast and reliable.

Yet another object of this invention is to provide a crossbar switching mechanism which requires few moving parts.

Yet another object of this invention is to provide a crossbar switching mechanism which can be manufactured from inexpensive materials readily available on the market.

A further object of this invention is to provide a crossbar switching mechanism which has greater flexibilty for use in programming, computerization, and communication systems generally.

Yet a further object of this invention is to provide a crossbar switching system which permits the use of colored filters for varying the intensity of the light utilized in the system.

Still a further object of this invention is to provide a crossbar switching system which provides means for increasing or leasening the intensity of the wave or light in the system.

Another object of this invention is to provide a crossbar switching mechanism which allows for a systematized changing of light aperatures for changing the intensity of the light beam.

Still another object of this invention is to provide a crossbar switching mechanism which utilizes photocells and means for varying the intensity of the signal emitting from the photocell circuit.

In summary therefore, this invention pertains specifically to light or wave-type responsive crossbar switching mechanisms which for a given area can accommodate a greater number of electrical components or circuits either by varying the intensity of the light or wave by use of a filter shutter, aperture, or an electrical means for varying the power supplied to the light or wave source.

These and other objects of this invention will be apparent from the following description and claims.

Figures 1, 2:
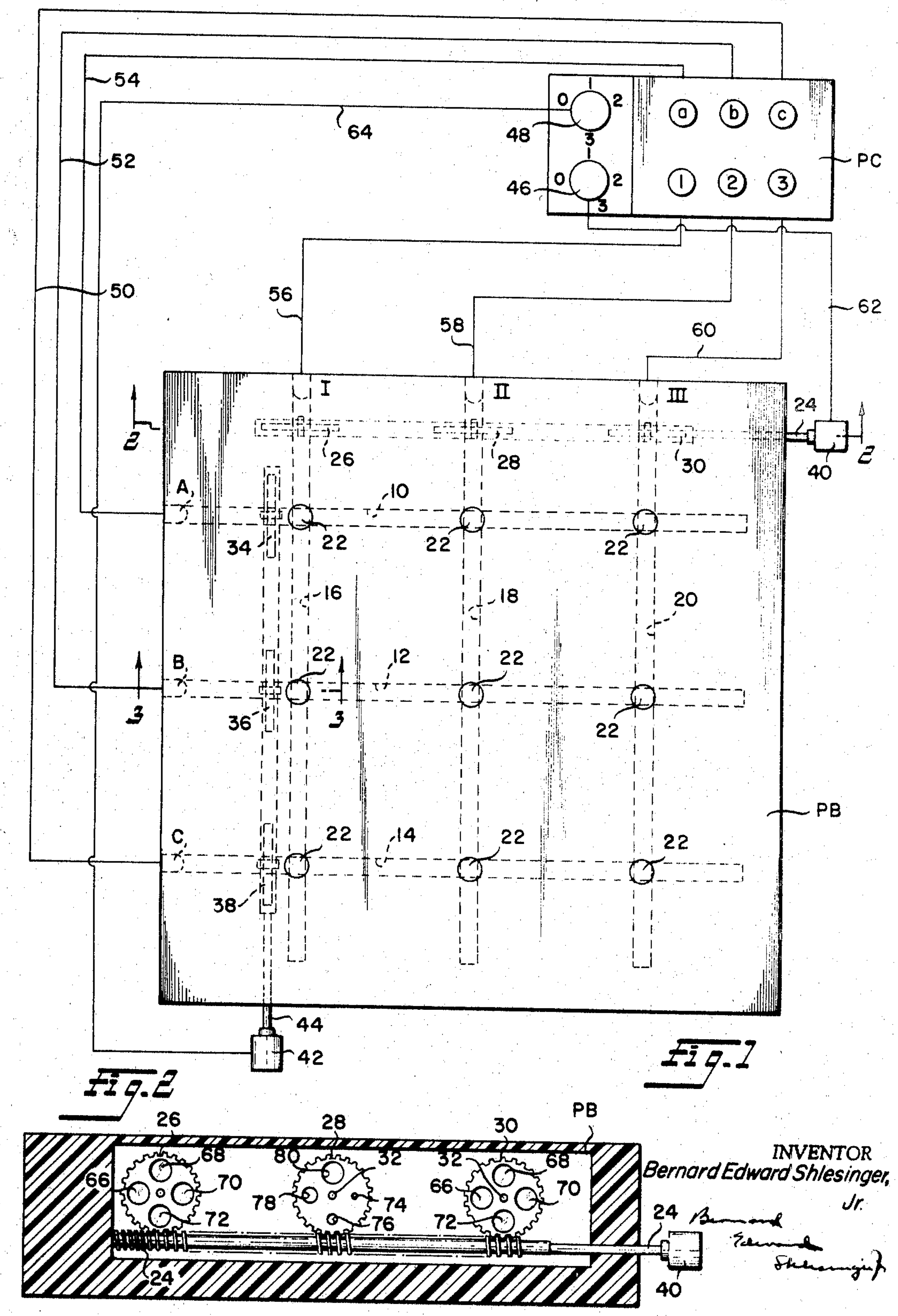
FIGURE 1 is a plan view illustrating the crossbar panel board and its control panel.
FIGURE 2 is a cross-sectional view taken along the line 2—2 in FIGURE 1 and viewed in the direction of the arrows.
Figure 3:
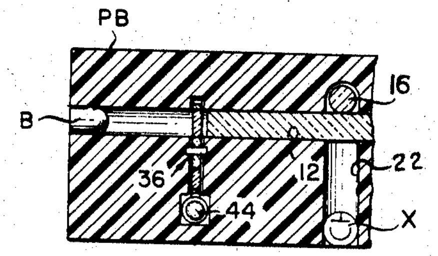
FIGURE 3 is a fragmentary cross-sectional view taken along the line 3—3 in FIGURE 1 and viewed in the direction of the arrows.

In the drawings which illustrate the various embodiments of this invention:

*FIGURES 1 through 3*

In FIGURE 1, the panel board PB is provided with a series of cross channels 10, 12 and 14 running horizontally as illustrated in FIGURE 1, and 16, 18 and 20 running vertically. Areas of intersection including receptacles 22 are provided in the board for receipt of a sensing mechanism such as a photocell.

The cross channels 10, 12, 14, 16, 18 and 20 may receive a wave form or a device for receiving a wave form such as lucite or a fiber optic rod.

At the end of the channels 10, 12 and 14 are positioned lights A, B and C. At the ends of the channels 16, 18 and 20 are positioned lights I, II and III. The lights A, B and C and I, II, III are connected to a panel control PC which is provided with corresponding switch buttons *a*, *b* and *c* and 1, 2 and 3 respectively.

Mounted in the board PB is a worm gear 24 as best illustrated in FIGURE 2. The worm gear 24 drives a series of discs 26, 28 and 30. The discs 26, 28 and 30 are rotatably mounted on axles 32. Though a single series of discs are sufficient for most purposes, a second series of discs 34, 36 and 38 may be provided operating in the same manner as discs 26, 28 and 30. The second series of discs 34, 36 and 38 are generally at right angles to the discs 26, 28 and 30. Motor 40 drives the worm gear 24 which in turn rotates the discs 26, 28 and 30. Motor 42 drives a worm gear 44 which in turn drives the discs 34, 36 and 38.

The motors 40 and 42 are controlled by rotary switches 46 and 48 respectively. The lights A, B and C are connected to the control panel PC by connecting wires 50, 52 and 54 and specifically to the push buttons *a*, *b* and *c*. The lights I, II and III are connected to the control panel PC by means of electrical wires 56, 58 and 60.

Motor 40 is connected to the rotary switch 46 by means of a connecting wire 62, and motor 42 is connected to rotary switch 48 by means of a connecting wire 64.

In FIGURE 2, the discs 26 and 30 have openings therein for receipt of filters 66, 68, 70 and 72. The filters may be colored for purposes of reducing light intensity or transparent, etc. Disc 28 is provided with a series of apertures 74, 76, 78 and 80 which vary in size from one another. The size variation is used to reduce the intensity of the light by limiting the amount of light going through the aperture. It should be noted that the top filter and apertures such as 68 and 80 are aligned with the cross channels 16, 18 and 20.

*Operation of the devices illustrated in FIGURES 1 through 3*

The operation of the device illustrated in FIGURES 1 through 3 is similar to that described in my earlier application in that when for example button *a* and button 1 are depressed, lights A and I are turned on and the rays of light travel the cross channels 16 and 10 and at their intersection or receptacle 22, have a combined intensity sufficient to operate a photocell or the like. The threshold of the photocell is set so that it is higher than the maximum of any one of the lights A, B, C, or I, II, or III. The threshold will not exceed the combined intensity at the intersection or receptacle 22 of two of the intersecting lights.

The switches 46 and 48 are used to index the motors 40 and 42 so as to bring up a different colored filter or a different sized aperture or the like in order to vary the intensity at the intersection. It will now be understood, that the photocells located at the intersections can each be connected to a series of components each operative at different threshold level of combined intensity at the intersections. Thus greater flexilility and many more combinations and circuits can be operated with the same spacing arrangement as previously handled by the invention disclosed in my earlier application.

It will be obvious that where intensity combinations are not required, one series of filters, apertures, or the like may be all that is necessary. Similarly, only one rheostat may be required for increasing or decreasing the intensity of the lights in only one series of lights. Where color combinations are utilized, or aperture control sizes are utilized, the combination of sizes or colors of two series can be used to reduce the overall size of the apparatus since a single disc might, of necessity, be considerably larger and more difficult to mount for operation.

It is also obvious, that the sensing devices 22 might be photochemical material sensitive to color which would become excited to emit light which can subsequently be picked-up by a photocell.

*FIGURE 4*

Figure 4:
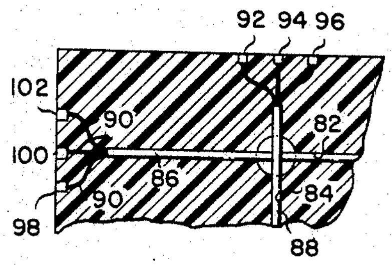
FIGURE 4 is a fragmentary cross-sectional view of another embodiment of this invention illustrating a fragment of a panel board having fiber optic system.

FIGURE 4 illustrates a further modification in which the panel board PB is provided with a fiber optic system in the channels 82 and 84 respectively. Bundles of fiber optics 86 and 88 have branches 90. Mounted in the board would be a series of different colored lights such as 92, 94 and 96 in the vertical plane and 98, 100 and 102 in the horizontal plane. Lights 92 and 98 may for example be red; lights 94 and 100 may be blue; and lights 96 and 102 may be yellow. Means (not shown) for selecting the preferred colored light in a series would be provided on the control panel. It might also be provided on the panel board or adjacent thereto. This arrangement permits one bundle of fibers to carry a particular colored light to an intersection to be combined with the same color or a different colored light entering the intersection from the intersection bundle of fibers transmitting the light from the selected colored source of the other series. The various bundles of fibers may be arranged in the manner heretofore set out in my aforementioned application.

It will be obvious, that instead of having different colored light sources 92, 94, 96, 98, 100 and 102, they may be of the same color but of different light intensity thus eliminating any need for a selector switch or rheostat.

*FIGURE 5*

Figure 5:
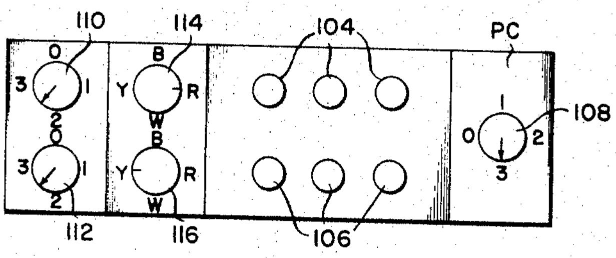
FIGURE 5 is a plan view illustrating the control panel of still another embodiment of this invention.

FIGURE 5 shows a control panel PC having first series buttons 104 and second series buttons 106. The panel is provided with a control member 108 which would connect to a variable resistance for controlling the voltage of the current flowing from the photocell sensing device or the like. This permits selective control of a plurality of circuits as will hereinafter be described.

On the left side of the panel are provided two control members 110 and 112 for varying the intensity of the light emitted from the light sources. Control member 110 will control the intensity of the light for the series of light sources operated by the buttons 104. Similarly, the control member 112 will control the intensity of the light operated when the push buttons 106 are operated. For further selective control, the panel board is also provided with control members 114 and 116. These control members are used to control the aperture size of the color filter, etc. Control member 114 operates to shift the filter, etc., in front of the light source used in conjunction with the series of buttons 104. Similarly, control 116 operates to change the aperture or filter, etc., used in conjunction with the light source operated by the series of buttons 106. As was pointed out above, control members 110 and 114 may be sufficient if the other series of light sources is held constant. This would eliminate the necessity of having control members 112 and 116. These members would be provided only for very complexed series operations.

*FIGURES 6, 7, 8 and 9*

Figure 6:
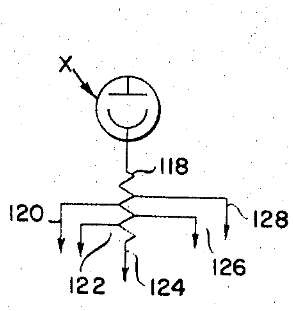
FIGURES 6, 7, 8 and 9 illustrate various embodiments of the photocell circuits of this invention.
Figure 7:
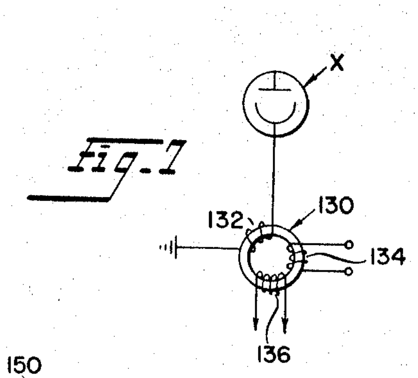
Figure 8:
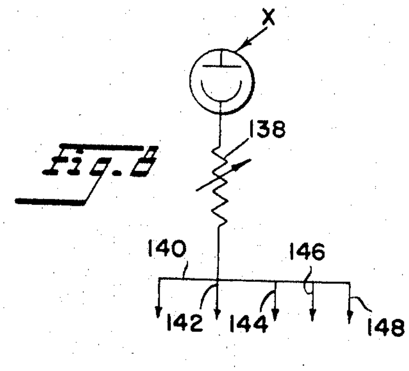

In FIGURES 6, 7 and 8, the photocell is designated as X. In FIGURE 6 the photocell X is connected to a resistance 118. A series of leads 120, 122, 124, 126 and 128 are shunted at different levels to be connected to various electrical components (not shown) having different electrical operating characteristics. By varying the intensity of the light at the intersection, the amount of current flowing through the resistance 118 can be controlled so as to operate certain of the circuits connected to the leads 120 through 128. There may be electrical devices built into any of the selected circuits which will operate only at a specific voltage level and which will cut out if the voltage rises or drops.

FIGURE 7 shows the photocell X connected to a memory device 130. An input coil 132 is provided on the memory device 130. An erasing coil 134 is also provided for erasing any signal put into the memory device 130. A pick-up coil 136 is provided which will be connected to an electrical component for the purposes of reading out a signal stored in the memory device 130 at such time as desired. It will thus be obvious that the switching operation is now provided with a computerization feature which allows for storage of certain information.

In FIGURE 8, the photocell X is connected to a variable resistance 138 which is connected in series to a plurality of leads 140, 142, 144, 146 and 148 which are connected to various electrical circuits or components or the like each operating at a different threshold level.

Figure 9:
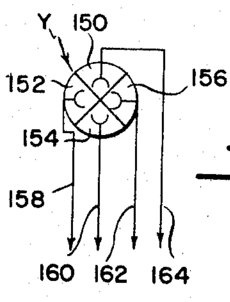

FIGURE 9 shows a different type of photocell Y which is actually a composite of a plurality of photocells 150, 152, 154 and 156 arranged in a quadrant. The photocells are connected to various components (not shown) by leads 158, 160, 162 and 164. It will be further obvious that a photocell unit Y can be arranged to have each photocell operated at a different threshold level so as to operate selective circuits as required. An operator merely has to select the proper intensity desired for operation of the required circuit.

While the invention has been described, it will be understood that it is capable of further modifications, and this application is intended to cover any variations, uses, or adaptations of the invention following in general the principles of the invention and including such departures from the present disclosure as come within the known or customary practice in the art to which the invention pertains, and as may be applied to the essential features hereinbefore set forth and as fall within the scope of the invention or the limits of the appended claims.

Having thus described my invention what I claim is:

1. A cross bar switch comprising:
(a) a panel board
(b) a series of intersecting light transmitting members positioned in said panel board
(c) a separate light source for each of said members
(d) means for selectively operating each of said light sources
(e) a series of light sensitive elements located at the intersection of said light transmitting members, each sensitive to the combined light of two intersecting light transmitting members in the zone of their intersection only
(f) means for connecting each of said light sensitive elements to an electrical component for operation thereof when said light sensitive element is responsive to said combined light
(g) means for varying the intensity of the light produced by at least one of said light transmitting sources
(h) said light sensitive elements generating current proportionate to various levels of combined light intensity
(i) whereby said electrical components will be operated depending upon their electrical operating level.

2. A cross bar switch as in claim 1 and including:
(a) memory storage means connected to said connecting means for subsequent selective readout.

3. A cross bar switch as in claim 1 and including:
(a) means for varying the intensity of light produced by all of said light transmitting sources.

4. A cross bar switch as in claim 1 and wherein:
(a) said means for varying the intensity of light produced by at least one of said light transmitting sources includes colored filter means.

5. A cross bar switch as in claim 1 and wherein:
(a) said means for varying the intensity of light produced by at least one of said light transmitting sources includes light aperture control means.

6. A cross bar switch as in claim 1 and wherein:
(a) said means for varying the intensity of light produced by at least one of the said light transmitting sources includes filter means.

7. A cross bar switch as in claim 1 and wherein:
(a) said light sensitive elements have a minimum threshold greater than the intensity of any one of the light transmitting members at said intersection and not less than the minimum combined intensity of the light transmitting members at said intersection.

8. A cross bar switch as in claim 1 and wherein:
(a) said means for varying the intensity of light produced by at least one of said light transmitting sources includes a rheostat.

9. A cross bar switch as in claim 1 and wherein:
(a) said means for varying the intensity of light produced by at least one of said light transmitting sources include a rheostat and a light valve means.

10. A cross bar switch as in claim 1 and wherein:
(a) said light sensitive elements each include a plurality of segments each having a different threshold.

11. A cross bar switch as in claim 1 and including:
(a) means for varying the output current of said light sensitive element.

12. A cross bar switch as in claim 1 and wherein:
(a) said separate light sources each include a plurality of lights for each of said light transmitting members.

13. A cross bar switch as in claim 12 and wherein:
(a) each of said plurality of lights for each of said light transmitting members have a different light intensity.

14. A cross bar switch as in claim 12 and wherein:
(a) each of said plurality of lights for each of said light transmitting members have a different wave length.

15. A cross bar switch as in claim 12 and wherein:
(a) each of said light transmitting members include a plurality of branches, and including
(b) one of said plurality of lights for each of said branches.

16. A cross bar switch as in claim 14 and wherein:
(a) said colored filter means included a pair of individually operated colored filter members.

17. A cross bar switch as in claim 14 and wherein:
(a) said colored filter means includes a plate having a series of colored filters mounted therein.

References Cited

UNITED STATES PATENTS 3,360,657 12/1967 Schlesinger -------- 350—96 X

ROBERT SEGAL, *Primary Examiner.*

U.S. Cl. X.R.

340—173; 350—96